United States Patent Office 2,708,205
Patented May 10, 1955

2,708,205

ORGANIC TITANIUM COMPOUNDS

John H. Haslam, Wilmington, Del., assignor to E. I. du Pont de Nemours and Company, Wilmington, Del., a corporation of Delaware No Drawing. Application July 31, 1952,
Serial No. 301,969

16 Claims. (Cl. 260—429)

This invention relates to novel organic titanium compounds, and more particularly to new, unsaturated esters of titanium. More specifically, it relates to new vinyl esters of titanium and novel methods for their manufacture.

The preparation of titanium esters of certain unsaturated alcohols with the double bond at least one carbon removed from the carbinol carbon is already known. Thus, U. S. Patent 2,258,718 produces such esters by refluxing an unsaturated alcohol, such as allyl alcohol, with an ortho ester of titanium, usually in the presence of a catalyst. However, such an ester interchange process cannot be employed in the production of titanium esters of vinyl or substituted vinyl alcohols because these alcohols are not known in the pure, unpolymerized state.

It is among the objects of this invention to prepare new, unsaturated titanium esters, particularly those in which one to four of the oxygens attached to the titanium atom are also adjacent to an olefinic carbon atom and to provide novel methods for effecting the preparation of such esters. A further object is to prepare new polymeric forms of said esters and to provide novel and useful methods for their preparation. An additional object is to provide novel reaction products outstandingly useful as plastic and rubber composition modifiers. Other objects and advantages of the invention will be apparent from the ensuing description thereof.

These and other objects and advantages are obtainable in this invention which comprises the production of an unsaturated, titanated ester by reacting an enol-forming carbonyl radical-containing compound selected from the group consisting of an aldehyde and ketone with a titanium ortho ester, and throughout the reaction removing from the reaction zone alcohol co-product formed in the process.

In a more specific and preferred embodiment, the invention comprises preparing tetravinyl esters of titanium by contacting and commingling an enol-forming carbonyl radical-containing organic compound from the group consisting of an aldehyde and ketone with an alkyl titanate, maintaining the temperature of the reaction mixture substantially above the vaporization temperature of the co-product alcohol formed in the reaction, removing said co-product alcohol from the reaction zone as formed, and recovering the desired tetravinyl ester of titanium.

In one practical adaptation of the invention, a suitable aldehyde, such as acetaldehyde, or a ketone, such as acetone, or other carbonyl-containing compound which yields an enol due to migration of a hydrogen atom adjacent to the >C=O group, can be mixed with a suitable quantity of an alkyl titanium ester for reaction at an elevated temperature in a reactor equipped with a fractionating tower. If desired, the reaction can be effected in the presence of an inert organic, particularly a hydrocarbon solvent, such as n-heptane, benzene, toluene, xylene, etc. Preferably, the titanium ortho ester used comprises an ester of a saturated alcohol whose boiling point is lower than that of the enolizable aldehyde or ketone. The mixture is then heated to and maintained at a reaction temperature above the boiling point of the co-product saturated alcohol of the initial titanium ester and said co-product is continuously and completely removed from the reaction mixture by distillation or fractionation throughout the reaction. Alternatively, the reaction can be conducted by the use of titanium ortho esters of an alcohol whose boiling point is higher than that of the aldehyde or ketone. In such instances, unreacted enolizable aldehyde or ketone can be removed by resorting to suitable vaporization techniques along with the co-product alcohol. Subsequent separation and recycling of the former to the reactor can then be effected, should this be desired.

The reaction of the enol form of the aldehyde with the titanium ortho ester to form the vinyl type esters of titanium contemplated herein takes place readily under the proper anhydrous conditions. Preferably, and to obtain highest yields of the desired vinyl esters, the reaction time is maintained over as short a period as possible in order to avoid the many interfering side reactions which are likewise catalyzed by the presence of titanium ortho esters. These side reactions include Meerwein-Pondorf reductions to alcohols and aldol type condensations, either of which materially reduces the yield of desired vinyl type esters of titanium.

If desired, the reaction can be stopped before going to completion to produce a mixed titanium ortho ester wherein the titanium atom of the reaction product contains up to 3 vinyl ester groups as well as the residual saturated ester group or groups. The vinyl ester reaction products, whether fully substituted or mixed, can be polymerized in the course of the reaction. Furthermore, after completion of the reaction the vinyl esters produced can be allowed or caused to polymerize to higher-molecular-weight products.

To a clearer understanding of the invention, the following specific examples are given. These are merely in illustration but not in limitation of the invention:

*Example I*

A 2-liter, three-necked flask was equipped with a centrifugal gas dispersion stirrer and a fractionating column. 56 grams (.2 gram mol) of pure tetra isopropyl titanate in 1 liter of n-heptane was added to the flask and brought to 85° C. An excess (a total of 6 mols) of vaporized acetaldehyde was introduced continuously through the centrifugal gas dispersion stirrer, and distillate taken off at such a rate that the vapor temperature remained above 85° C., thereby removing isopropanol as formed through the fractionating column. After 5 hours of reaction the solution was yellow, and after 13 hours the reaction was stopped, the solution being a cherry red vinyl titanate product. The distillate which had been removed was refractionated and found to contain .4 mol of isopropanol, indicating replacement of about 50% of the isopropyl radicals with vinyl radicals. Room temperature vacuum evaporation of the cherry red vinyl titanate product to remove the heptane solvent produced a red product, which on standing for a few days polymerized and became insoluble in heptane. Excess acetaldehyde was recovered along with the isopropanol through the fractionating column. The final product on analysis was found to consist of monomeric divinyl diisopropyl titanate.

*Example II*

Four gram mols of phenylacetaldehyde and 1 gram mol of tetraisopropyl titanate were mixed in a conventional type reaction vessel equipped with a fractionating column. While maintaining the pot temperature of the vessel at 90–100° C., the reaction of the mixture was effected and continued until the evolution of isopropanol co-product ceased, such isopropanol co-product being removed from the vessel continuously and as generated. The monomeric tetrastyryl titanate reaction product remaining within the vessel was a red-brown viscous liquid, which polymerized upon attempted high vacuum distillation.

*Example III*

Four gram mols of heptaldehyde and one gram mol of tetraisopropyl titanate were mixed in a conventional type reaction flask equipped with a fractionating column. The mixture was heated therein to produce a vapor temperature of 82° C. and was maintained at that temperature until completion of the reaction. Isopropyl alcohol formed was continuously removed during the reaction. The final product was found to consist of monomeric tetrahepten-1-yl-1 titanate.

*Example IV*

Five gram mols of mesityl oxide and one gram mol of tetraisopropyl titanate and 1000 ml. of cyclohexane were placed in a conventional fractionating still and the mixture heated to effect reaction. The cyclohexane isopropanol azeotrope, boiling at 69° C., distilled off as rapidly as the isopropanol was formed. In all, 600 ml. of distillate was removed from the still, of which 150 ml. was isopropanol. This amount of isopropanol was approximately equivalent to the theoretical two mols, indicating about 50% complete reaction of the tetraisopropyl titanate. The remaining cyclohexane and excess mesityl oxide were removed by distillation, the product, dihexadienyl diisopropyl titanate, obtained being a red-brown liquid. On being heated to approximately 225° C., the monomeric dihexadienyl diisopropyl titanate began to polymerize, first increasing in viscosity, and finally setting up to an intractable solid.

Although specific reactants, ratios, and temperatures have been mentioned as utilizable herein, the invention is not restricted thereto. In general, any titanium ortho ester corresponding to the formula $Ti(OR)_4$ wherein R is an organic hydrocarbon radical, e. g., alkyl, aryl, aralkyl, alkaryl, etc., of which methyl, ethyl, propyl, isopropyl, butyl, hexyl, octyl, phenyl, benzyl, tolyl, and naphthyl are examples, can be used. Alkyl titanates, including those of methyl, ethyl, propyl, isopropyl, and the various butyl esters, are especially preferred and useful. These can be prepared by reacting, for example, $TiCl_4$ with an anhydrous monofunctional alcohol in accordance with known procedures. As already noted, use is preferred of titanium esters of an alcohol whose boiling point is below that of the enolizable aldehyde or ketone, although, as shown in Example I, this is not essential.

Similarly, any enol-forming aldehyde

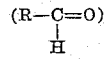

or ketone

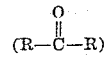

compound, or mixture, can be used in the invention. Examples thereof include: acetaldehyde, propionaldehyde, butyraldehyde, valeraldehyde, nonaldehyde, acrolein, crotonaldehyde, benzaldehyde, p-tolualdehyde, phenylacetaldehyde, etc.; acetone, ethyl methyl ketone, diethyl ketone, methyl propyl ketone, allylacetone, mesityl oxide, acetophenone, methyl phenyl ketone, benzyl methyl ketone, etc.

The reaction involved in my novel process can be represented by the following stepwise reversable equations:

$$R''_2CH.CR'O + Ti(OR)_4 \rightleftarrows Ti(OR)_3.(OCR'=CR''_2) + ROH$$

$$R''_2CH.CR'O + Ti(OR)_3.(OCR'=CR''_2) \rightleftarrows Ti(OR)_2.(OCR'=CR''_2)_2 + ROH$$

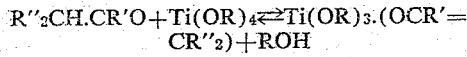

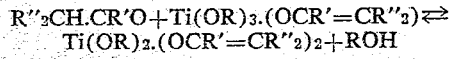

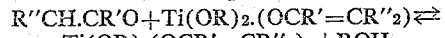

wherein R consists of an alkyl, aryl, alkylene, cycloalkyl, or alkylaryl radical and R' and R'' are hydrogen, an alkyl, aryl, alkylene, cycloalkyl, or alkylaryl radical.

Because of the complete reversibility of this stepwise reaction at all stages, effective, immediate, and continuous removal of the saturated alcohol reaction coproduct from the reaction zone is a necessary condition for the formation of my novel vinyl esters. In ester interchange reactions, on the other hand, refluxing in the presence of an excess of the alcoholyzing alcohol until equilibrium conditions are reached is usually required. Removal of the exchanged alcohol components need not be done with rapidity. However, such a procedure cannot be used for the production of vinyl titanates from enol-forming aldehydes or ketones as none of the desired product will be obtained.

Various vinyl esters of titanium and substituted vinyl esters of titanium can be prepared herein by use of the appropriate enolizable aldehyde or ketone. Thus, to obtain the vinyl ester of titanium, acetaldehyde may be used and, to produce the styryl ester of titanium, phenacetaldehyde can be employed. Similarly, other enolizable aldehydes or ketones, such as above mentioned, can be used to produce other forms of vinyl type esters of titanium.

Polymerization inhibitors usually effective in preventing or controlling polymerization of vinyl compounds are ineffective in controlling the polymerization of monomeric vinyl and substituted vinyl esters of titanium. Polymerization control of the vinyl titanates while being formed is obtained by controlling temperature and concentration conditions. The mixed vinyl titanate made from acetaldehyde is highly reactive, and unless the reactants are diluted by an inert organic solvent, only polymerized vinyl titanate will be obtained from the reaction mixture. The substituted vinyl titanates, being somewhat less reactive, usually must be heated to cause polymerization. Temperature conditions may be varied to some degree by varying the titanium ester used. The lower the boiling point of the co-product alcohol from the titanium ester, the lower the reaction temperature may be held. This condition favors the use of the less expensive esters of short chain alcohols such as methyl, ethyl, propyl or butyl alcohols. If a polymerized product of a substituted vinyl titanate is desired, titanium esters of alcohols whose boiling points are higher may be used. Thus, in the case of the styryl titanate obtained in Example II, a polymerized product can be obtained if the reaction temperature is held at 150° C. or above, whereas in the 90–100° C. range the monomer is produced.

Separation or removal of the co-product alcohol from the reaction zone is usually accomplished by vaporization methods. Other methods of separation, removal or inactivation of said co-product alcohol are adaptable however.

It has been discovered that the

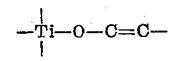

grouping is a chromophoric group, characterized by red, orange, or yellow coloration. This is true of all vinyl type compounds, whereas other unsaturated aliphatic ortho esters of titanium, for example tetraallyl titanate, are colorless. The same chromophoric linkage also exists in aromatic ortho esters of titanium, and the same coloration is exhibited.

I claim as my invention:

1. A process for preparing a vinyl ester of titanium which comprises reacting an enol-forming carbonyl-radical-containing organic compound selected from the group consisting of an aldehyde and ketone with a titanium ortho ester, during the reaction maintaining the reactants at a temperature above the boiling point of the co-product alcohol formed in the process and continuously removing said co-product alcohol from the reaction zone as formed, and recovering the vinyl ester product.

2. A process for preparing polymerized vinyl esters of titanium comprising contacting and commingling an enol-forming carbonyl-radical-containing compound selected from the group consisting of an aldehyde and ketone with a titanium ortho ester, maintaining the temperature of the reaction mixture substantially above the vaporization temperature of co-product alcohol formed in the process, continuously removing alcohol co-product from the reaction zone as formed, and recovering the polymerized product.

3. A process for preparing a vinyl ester of titanium comprising contacting and commingling for reaction an enol-forming compound selected from the group consisting of an aldehyde and ketone with a titanium ortho ester in the presence of a hydrocarbon solvent, maintaining the temperature of the reaction mixture above the vaporization temperature of co-product alcohol formed during the reaction, continuously removing said co-product alcohol as formed from the reaction zone by distillation, and recovering the vinyl ester product.

4. A process for preparing a vinyl ester of titanium comprising contacting and commingling an enol-forming compound selected from the group consisting of an aldehyde and ketone with an alkyl titanate in the presence of a hydrocarbon solvent, maintaining the temperature of the reaction mixture above the vaporization temperature of the co-product alcohol formed in the process, continuously removing said co-product alcohol as formed from the reaction mixture by distillation, and recovering the vinyl ester product.

5. A process for preparing tetrastyryl titanate comprising reacting phenylacetaldehyde with a titanium ortho ester, maintaining the temperature of the reaction mixture above the vaporization temperature of the co-product alcohol formed in the reaction, continuously removing said co-product alcohol as formed from the reactor, and recovering the tetrastyryl titanate product.

6. A process for preparing tetrahepten-1-yl-1 titanate comprising reacting heptaldehyde with a titanium ortho ester, maintaining the temperature of the reaction mixture above the vaporization temperature of the co-product alcohol formed in the process, continuously removing said co-product alcohol as formed from the reaction mixture, and recovering the resulting titanate product.

7. A process for preparing a mixed divinyl-diisopropyl titanate comprising passing vaporized acetaldehyde into a solution of tetraisopropyl titanate in hydrocarbon solvent in a reaction zone while agitating the reaction mixture, maintaining a reaction temperature in said zone above the vaporization temperature of the co-product isopropanol formed in the reaction, continuously removing vaporized co-product alcohol is formed together with unreacted acetaldehyde by distillation, and recovering the resulting titanate product.

8. A process for preparing a tetrastyryl ester of titanium comprising contacting and commingling 4 mols of phenylacetaldehyde and one mol of tetraisopropyl titanate in a reaction zone, maintaining a reaction temperature therein above the vaporization temperature of the co-product isopropanol formed in the process, continuously removing said co-product alcohol in vaporized state and as formed from said zone, and recovering the resulting titanium ester product.

9. A process for preparing a tetrahepten-1-yl-1 titanate comprising contacting and mixing 4 mols of heptaldehyde and one mol of tetraisopropyl titanate in a reaction zone, maintaining said zone at a temperature above the vaporization temperature of the co-product isopropanol formed in the reaction, removing the said co-product alcohol in vaporized state and as formed continuously from said zone, and recovering the resulting titanate product.

10. A process for preparing a mixed hexadienyl titanate comprising contacting and mixing an ortho ester of titanium with mesityl oxide in a reaction zone, maintaining said zone at a reaction temperature above the vaporization temperature of the co-product alcohol formed in the process, removing continuously from said zone co-product alcohol as formed, and recovering the resulting titanate product.

11. Divinyl-diisopropyl titanate.
12. Tetrastyryl titanate.
13. Tetrahepten-1-yl-1 titanate.
14. Dihexadienyl diisopropyl titanate.
15. Polymerized tetrastyryl titanate.
16. Polymerized dihexadienyl diisopropyl titanate.

References Cited in the file of this patent

J. Am. Chem. Soc., vol. 72, page 631 (1950).
J. Am. Chem. Soc., vol. 72, 481–15 (1950).
McHatton et al.: J. Chem. Soc. (London), July 1952, pages 2771–73.